US008670800B2

(12) United States Patent
Liu et al.

(10) Patent No.: US 8,670,800 B2
(45) Date of Patent: Mar. 11, 2014

(54) REMOVABLE BASEBAND CHIPSET

(75) Inventors: Yuk Tung Thomas Liu, Hong Kong (HK); XueLong Ronald Hu, San Diego, CA (US); Stephen Sushen Chiang, Los Angeles, CA (US); Shiqing Zhao, Shenzhen (CN)

(73) Assignee: TCT Mobile International Limited, Kowloon (HK)

( * ) Notice: Subject to any disclaimer, the term of this patent is extended or adjusted under 35 U.S.C. 154(b) by 204 days.

(21) Appl. No.: 13/161,235

(22) Filed: Jun. 15, 2011

(65) Prior Publication Data

US 2012/0322503 A1    Dec. 20, 2012

(51) Int. Cl.
*H04W 88/02*    (2009.01)

(52) U.S. Cl.
USPC .......................................... 455/558; 455/557

(58) Field of Classification Search
USPC ................. 455/557, 558, 550.1, 552.1, 553.1
See application file for complete search history.

(56) References Cited

U.S. PATENT DOCUMENTS

| | | | |
|---|---|---|---|
| 5,559,501 A | 9/1996 | Barzegar et al. | |
| 6,015,092 A * | 1/2000 | Postlewaite et al. | 235/486 |
| 6,690,947 B1 | 2/2004 | Tom | |
| 6,766,143 B1 * | 7/2004 | Beckwith | 455/66.1 |
| 6,785,556 B2 | 8/2004 | Souissi | |
| 7,039,356 B2 | 5/2006 | Nguyen | |
| 7,194,285 B2 | 3/2007 | Tom | |
| 7,333,831 B2 | 2/2008 | Srinivasan et al. | |
| 7,603,139 B1 | 10/2009 | Tom | |
| 2006/0166659 A1 * | 7/2006 | Wiese et al. | 455/418 |
| 2006/0291483 A1 * | 12/2006 | Sela | 370/401 |
| 2007/0228139 A1 | 10/2007 | Wang et al. | |
| 2007/0229366 A1 | 10/2007 | Kim et al. | |
| 2008/0125164 A1 | 5/2008 | Singh | |
| 2009/0212908 A1 * | 8/2009 | Lin et al. | 340/5.81 |
| 2009/0239582 A1 * | 9/2009 | Lin | 455/558 |
| 2009/0264148 A1 | 10/2009 | Tom | |
| 2010/0093235 A1 * | 4/2010 | Huang | 439/892 |
| 2010/0304782 A1 * | 12/2010 | Chang et al. | 455/552.1 |
| 2011/0117964 A1 * | 5/2011 | Luo | 455/558 |
| 2011/0212747 A1 * | 9/2011 | Qin et al. | 455/553.1 |
| 2013/0144792 A1 * | 6/2013 | Nilsson et al. | 705/67 |

FOREIGN PATENT DOCUMENTS

| | | |
|---|---|---|
| CN | 101895490 A | 11/2010 |
| WO | WO 01/37437 | 5/2001 |

OTHER PUBLICATIONS

SIPO Office Action dated Nov. 5, 2012.

* cited by examiner

*Primary Examiner* — Cong Tran
(74) *Attorney, Agent, or Firm* — Shimokaji & Associates P.C.

(57) ABSTRACT

A communication device having a removable baseband chipset includes a communication device main body, a socket disposed on the communication device main body, a baseband processing unit configured to temporarily assemble to the socket, and a digital signal processing component that is contained in the baseband processing unit and is operable to enable the communication device to communicate with a cellular network system. The communication device is operable to transmit and receive radio signals.

6 Claims, 4 Drawing Sheets

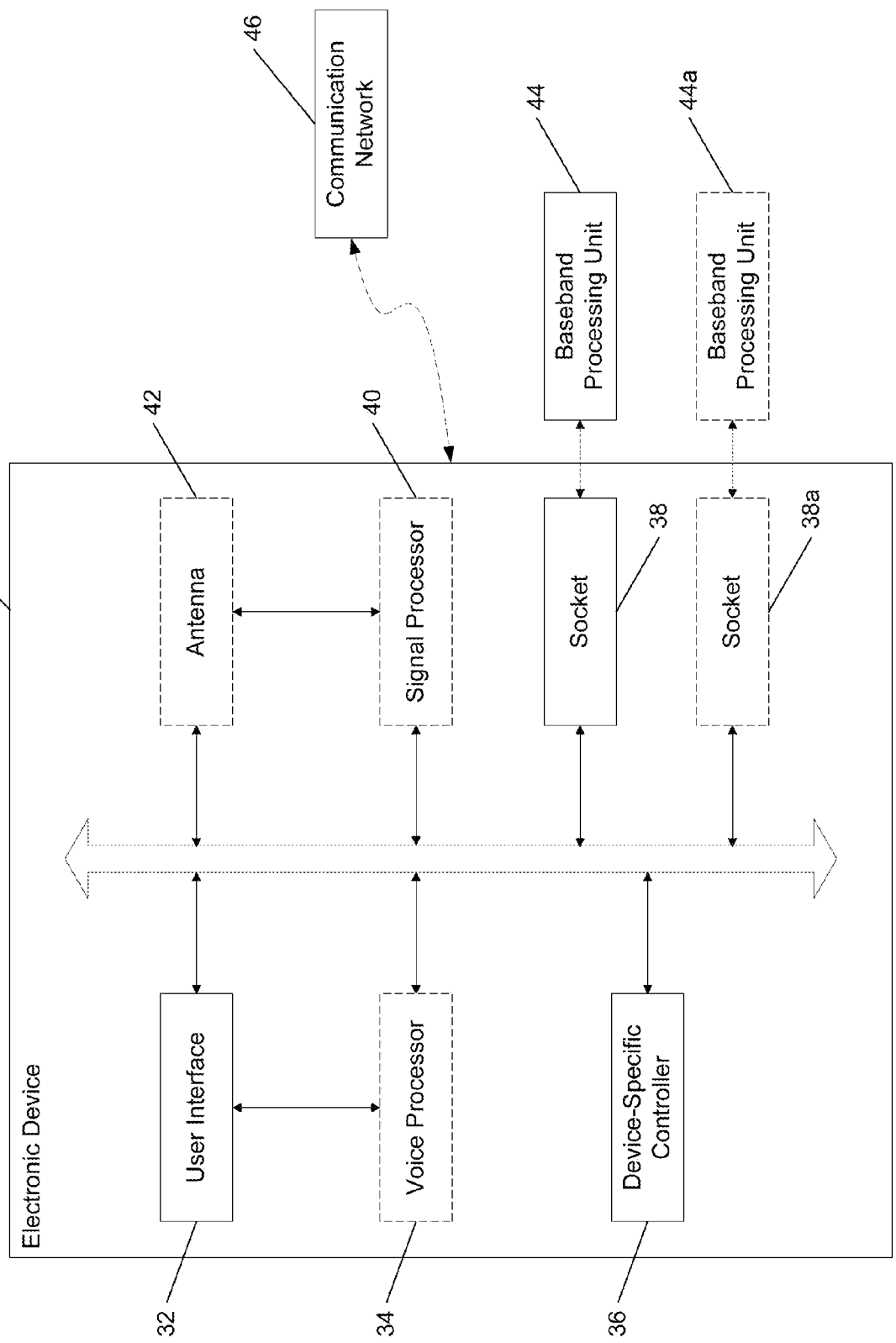

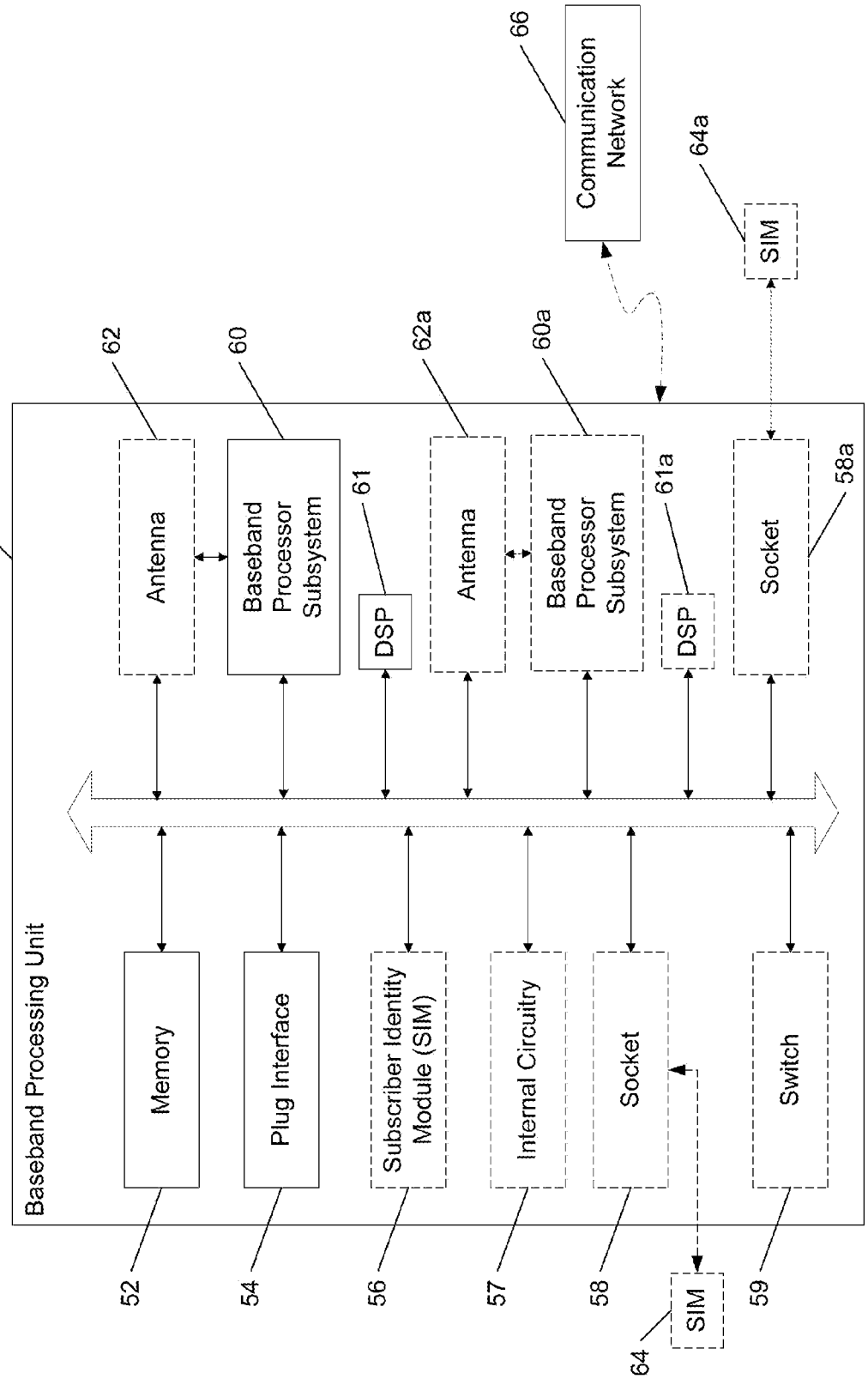

REMOVABLE BASEBAND CHIPSET

BACKGROUND OF THE INVENTION

The present invention relates to wireless communication devices and related apparatus, and more particularly, to wireless communication devices having a removable baseband chipset.

Modern electronic devices, which may include personal computing devices, tablet computing devices, and mobile or handheld devices, may require communication with a cellular network for voice or data communication. With reference to FIG. 1, a side perspective view of an electronic device 10 according to prior art is shown. Electronic device 10 includes a chipset 12 that is integrated in electronic device 10 and performs communication processing and causes electronic device 10 to be operable to communicate with a communication network (not pictured). Electronic device 10 is configured to have a socket 14 that receives a subscriber identity module 16 (SIM), which is assembled thereto. Chipset 12 includes a baseband processing unit integrated therein that is specific to a communication protocol, a cellular network, a locale, or an operating frequency. As can be seen, some modern electronic devices do not provide a capability of easily adding or switching baseband processing units to the electronic device to allow multi-mode cellular operation of the electronic device.

Therefore there is a need for an electronic device having a removable baseband chipset.

SUMMARY OF THE INVENTION

According to one exemplary embodiment of the present invention, a communication device is provided, the communication device comprising a communication device main body; a socket disposed on the communication device main body; a baseband processing unit, the baseband processing unit configured to temporarily assemble to the socket, and a digital signal processing component, the digital signal processing component being contained in the baseband processing unit and operable to enable the communication device to communicate with a cellular network system, wherein the communication device is operable to transmit and receive radio signals, wherein the communication requires digital signal processing to transmit and receive radio signals.

According to another exemplary embodiment of the present invention, a communication system is provided, the communication system comprising an electronic device; a first baseband processing unit; and a second baseband processing unit, wherein the electronic device is configured to receive either of the first baseband processing unit and the second baseband processing unit.

These and other features, aspects and advantages of the present invention will become better understood with reference to the following drawings, description and claims.

BRIEF DESCRIPTION OF THE DRAWINGS

FIG. 3 is a schematic diagram of the electronic device shown in FIG. 2; and

FIG. 4 is a schematic diagram of the baseband processing unit shown in FIG. 2.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, exemplary embodiments of the present invention provide a communication device including a main body, a socket disposed on the main body, a baseband processing unit for assembly in the socket, and a digital signal processing component contained in the baseband processing unit for communication with a cellular network system.

Figure 1:
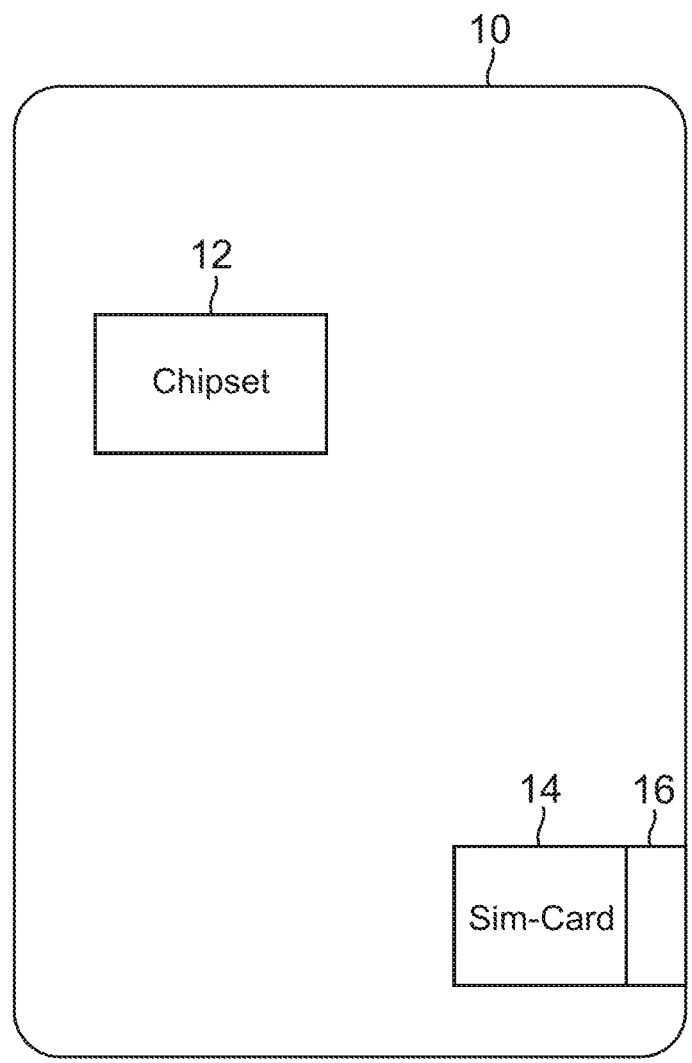
FIG. 1 is a side perspective view of a mobile communication device according to prior art.
Figure 2:
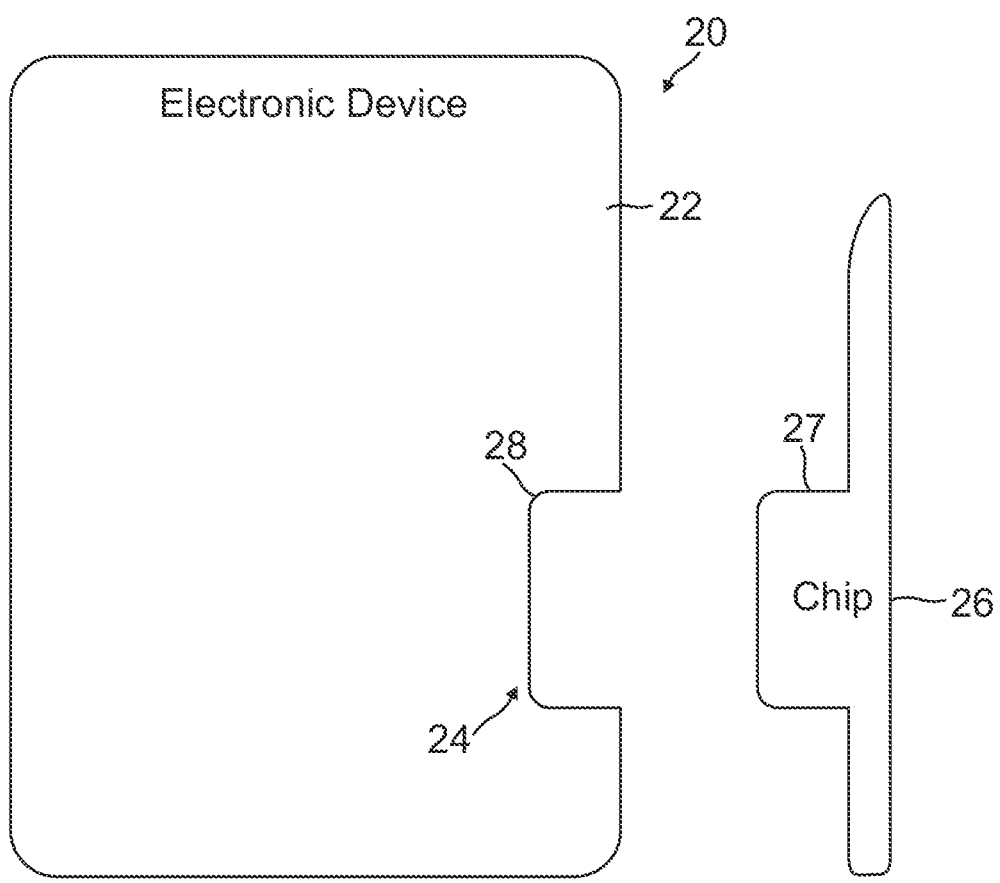
FIG. 2 is a side perspective view of a mobile communication device according to an exemplary embodiment of the preset invention.

Referring now to FIG. 2, a side perspective view of an electronic device 20 according to an exemplary embodiment of the present invention is shown. Electronic device 20 may include a device housing 22, which may be a main body or chassis of electronic device 20, and which may have a socket 24 formed or situated on an outside surface thereof. Socket 24 may be configured to receive a baseband processing unit 26 therein. Baseband processing unit 26 may have a housing 27, which may physically contain the components thereof and may be configured to assemble to socket 24. A latch 28 may engage or secure baseband processing unit 26 to device housing 22. Latch 28 may selectively secure baseband processing unit 26 by an interference fit, for example. According to some exemplary embodiments, latch 28 may be a single-use latch that permanently affixes baseband processing unit 26 to device housing 22.

Referring now to FIG. 3, a schematic diagram of an electronic device 30 according to an exemplary embodiment of the present invention is shown. Electronic device 30 may include a personal computing device, a table computing device, a handheld communication device (e.g., Apple® iPad®, iPod®, or iPhone®), an electronic-book reader, an automobile, a home appliance, and a multimedia device (e.g., Apple® iTV®), for example. Electronic device 30 may include a user interface 32, which may be used to communicate with a user, and may include a human interface device including a touchscreen, a keypad, a microphone, a speaker, a screen, and a monitor, or an interface for connecting an external device (e.g., a universal serial bus (USB) port, a Firewire® port, a serial advanced technology attachment (SATA) port, an IBM® Personal System/2 (PS/2) port). Electronic device 30 may include a voice processor 34, which may be in communication with user interface 32 and specially configured to perform filtering and analog to digital encoding of a voice signal. Electronic device 30 may include a device specific controller 36, which may control or execute program code or computer readable instructions, and may include a microprocessor, an application specific integrated circuit (ASIC), and a field programmable gate array (FPGA), for example. Electronic device 30 may include a socket 38 that may accept a baseband processing unit 44 therein. Socket 38 may be a port or a plug configured to be complementary to baseband processing unit 44. Socket 38 may be in communication with a signal processor 40, which may be configured to perform signal processing related to transmitting and receiving radio signals. Signal processor 40 may be in communication with an antenna 42, which may provide transmission and reception (i.e., transceiver) capability therefor. According to some exemplary embodiments, signal processor 40 may be a digital signal processor (DSP), for example. According to some exemplary embodiments, electronic device 30 may include a second socket 38a that may accept a second baseband processing unit 44a therein. Socket 38a may be configured to be complementary to baseband processing unit 44a. According to some exemplary embodiments, antenna 42 may be specially configured to operate in a predetermined frequency band. Electronic device 30 may be in communication with a communication network 46, which may include a cellular network, for example. According to some exemplary embodiments, baseband processing unit 44 may wholly provide a transceiver capability for electronic device 30. According to other exemplary embodiments, baseband processing unit 44 may provide carrier-specific signal processing, encoding, decoding, encryption, decryption, packetizing, or depacketizing, for example.

Referring now to FIG. 4, a schematic diagram of a baseband processing unit 50 is shown according to an exemplary embodiment of the present invention. Baseband processing unit 50 may include a memory 52, which may include random access memory devices comprising, for example, the main memory storage of baseband processing unit 50 as well as supplemental levels of memory (e.g., cache memories, non-volatile memories, read-only memories, programmable or flash memories, or backup memories). Baseband processing unit 50 may include a plug interface 54, which may be complementary to socket 38 and configured to temporarily assemble thereto. Baseband processing unit 50 may have a subscriber identity module 56 (SIM) integrated therein, and may include internal circuitry 57. According to some exemplary embodiments, SIM 56 may be integrated, or permanently built into, baseband processing unit 50. Baseband processing unit 50 may include a socket 58, which may be configured to temporarily receive a SIM 64. According to some exemplary embodiments, baseband processing unit 50 may include a second socket 58a, which may be configured to temporarily receive a second SIM 64a. SIM 64 and second SIM 64a may be socket attached, or temporarily assembled, to sockets 58 and 58a respectively. Subscriber identity modules 56, 64, 64a may securely store a subscriber key that may identify a user, a subscriber, or an associated baseband processing unit 50 on a cellular network by a service provider.

Baseband processing unit 50 may include a baseband processor subsystem 60, which may be in communication with a DSP component 61 and with an antenna 62. Antenna 62 may transmit and receive radio signals, and may be specially configured to operate in a predetermined frequency band. DSP component 61 may perform signal processing that may be carrier specific (i.e., proprietary) or protocol specific, for example. Baseband processing unit 50 may be in communication with a communication network 66, which may include a cellular network, for example. Baseband processing unit 50 may require that at least one of SIMs 56, 64, 64a be present or assembled thereto to enable communication with communication network 66. In one exemplary embodiment, baseband processing unit 50 may not have either socket 58, which may necessitate SIM 56. According to still other embodiments, baseband processing unit 50 may be operable to accept a plurality of SIMs 56, 64, 64a, and simultaneously utilize or operate two or more thereof.

Baseband processing unit 50 may include a switch 59, which may be capable of selecting a component or multiple components for active operation among a plurality of components of baseband processing unit 50 including SIM 56, SIM 64, and second SIM 64a, for example. A switch 59 selection may be made by a user (e.g., a hardware switch), by internal circuitry 57, or by electronic device 30, for example According to some exemplary embodiments, switch 59 may include a multiple throw, or multiple pole switch.

According to some exemplary embodiments, baseband processing unit 50 may include a second baseband processor subsystem 60a, which may provide multi-mode operation for baseband processing unit 50, allowing baseband processing unit 50 to operate in an additional cellular network, communicate with an additional protocols, additional bandwidths, an additional carrier signal, additional operating frequency, or additional communication standard, for example. Baseband processor subsystems 60 or second baseband processor subsystem 60a may be selected for active operation by switch 59, which may be selected by a user or by electronic device 30, for example. Second baseband processor subsystem 60a may correspondingly be in communication with a second DSP component 61a and with a second antenna 62a.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A communication device comprising:
   a communication device main body;
   a socket disposed on the communication device main body;
   a plug interface complementary to the socket;
   a baseband processing unit configured to attach to the socket, wherein the baseband processing unit includes a subscriber identity module affixed internally to the baseband processing unit;
   a latch configured to secure the baseband processing unit to the socket; and
   a digital signal processing component contained in the baseband processing unit,
   wherein the digital signal processing component performs a protocol-specific processing for the communication device,
   the baseband processing unit further comprising a second digital signal processing component that performs a second protocol-specific digital signal processing for the communication device, wherein the communication device is operable to selectively activate the digital signal processing component or the second digital signal processing component.

2. A communication system comprising:
an electronic device;
a first baseband processing unit including a first antenna; and
a second baseband processing unit including a second antenna,
wherein:
the electronic device is configured to receive either first baseband processing unit or the second baseband processing unit;
the first baseband processing unit includes a first socket;
the second baseband processing unit includes a second socket; and
the first socket and the second socket have complementary plug interfaces,
wherein the first baseband processing unit includes a multiple throw switch configured to allow a user to select one or more components for active operation within the first baseband processing unit.

3. The communication system of claim 2, further comprising a latch, the latch configured to secure the first baseband processing unit to the electronic device.

4. The communication system of claim 2, the electronic device further comprising a digital signal processing component for facilitating communication with a cellular communication network.

5. The communication system of claim 2, the first baseband processing unit further comprising a digital signal processing component for facilitating communication with a cellular communication network.

6. The communication system of claim 2,
the first baseband processing unit and the second baseband processing unit each including a separate respective subscriber identity module configured to temporarily assemble to at least one of the first socket and the second socket.

* * * * *